United States Patent
Guan

(10) Patent No.: US 11,907,264 B2
(45) Date of Patent: Feb. 20, 2024

(54) DATA PROCESSING METHOD, DATA QUERYING METHOD, AND SERVER DEVICE

(71) Applicant: BOE Technology Group Co., Ltd., Beijing (CN)

(72) Inventor: Rui Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 25 days.

(21) Appl. No.: 17/513,751

(22) Filed: Oct. 28, 2021

(65) Prior Publication Data
US 2022/0300534 A1   Sep. 22, 2022

(30) Foreign Application Priority Data
Mar. 16, 2021   (CN) .......................... 202110280918.6

(51) Int. Cl.
*G06F 16/00* (2019.01)
*G06F 16/28* (2019.01)
*G06F 16/22* (2019.01)
*G06F 16/26* (2019.01)

(52) U.S. Cl.
CPC .......... *G06F 16/283* (2019.01); *G06F 16/221* (2019.01); *G06F 16/2282* (2019.01); *G06F 16/26* (2019.01)

(58) Field of Classification Search
CPC ...... G06F 16/283; G06F 16/221; G06F 16/26; G06F 16/2282
See application file for complete search history.

(56) References Cited

U.S. PATENT DOCUMENTS

| | | | |
|---|---|---|---|
| 5,857,190 A * | 1/1999 | Brown | H04N 7/17318 348/E7.071 |
| 7,617,201 B1 * | 11/2009 | Bedell | G06F 16/283 707/999.005 |
| 2013/0055385 A1 * | 2/2013 | Antony | G06F 21/577 726/22 |
| 2014/0250053 A1 * | 9/2014 | Averbuch | G06F 16/283 707/600 |
| 2022/0147486 A1 * | 5/2022 | Shur | G06F 16/113 |

* cited by examiner

*Primary Examiner* — Dinku W Gebresenbet
(74) *Attorney, Agent, or Firm* — IPro, PLLC

(57) ABSTRACT

A data processing method includes: pulling full data regularly in accordance with a predetermined time, partitioning a DFS by date, and storing the full data in a corresponding partition of the DFS; filtering through the full data to obtain incremental data, sorting the incremental data, and storing the sorted data in a dimension table and an event table of a data warehouse detail layer, the dimension table being associated with the event table through a surrogate key; and associating the dimension table with the event table to generate a report, generating an aggregate table in accordance with a predetermined aggregation demand, and storing the generated aggregate table at a reporting layer.

20 Claims, 6 Drawing Sheets

--- pulling full data regularly in accordance with a predetermined time, partitioning a DFS by date, and storing the full data in a corresponding partition of the DFS — S1 filtering through the full data to obtain incremental data, sorting the incremental data, and storing the sorted data in a dimension table and an event table of a data warehouse detail layer, the dimension table being associated with the event table through a surrogate key — S2 associating the dimension table with the event table to generate a report, generating an aggregate table in accordance with a predetermined aggregation demand, and storing the generated aggregate table at a reporting layer — S3 pulling full data regularly in accordance with a predetermined time, partitioning a DFS by date, and storing the full data in a corresponding partition of the DFS /S1 filtering through the full data to obtain incremental data, sorting the incremental data, and storing the sorted data in a dimension table and an event table of a data warehouse detail layer, the dimension table being associated with the event table through a surrogate key /S2 associating the dimension table with the event table to generate a report, generating an aggregate table in accordance with a predetermined aggregation demand, and storing the generated aggregate table at a reporting layer /S3

FIG. 1

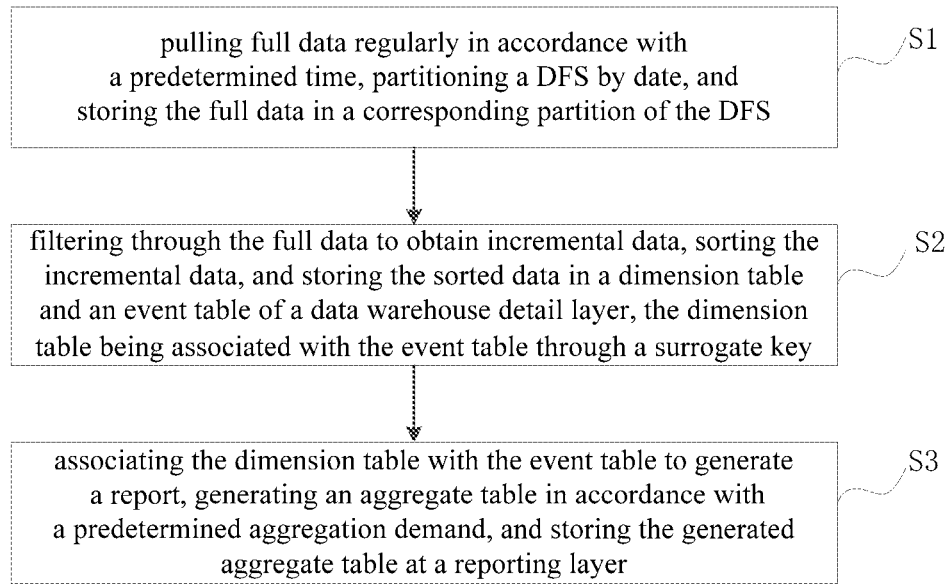

FIG. 2

| user ID | delivery address | detail | order time |
|---|---|---|---|
| Tom | company A | purchasing bookshelf | 2021/3/9/08:25 |
| Tom | company A | purchasing mobile phone | 2021/3/9/08:26 |
| Tom | home B | purchasing snacks | 2021/3/9/08:30 |
| Tom | home B | purchasing clothes | 2021/3/9/08:35 |
| Tom | parent's address C | purchasing fruits | 2021/3/9/08:40 |

FIG. 3 dimension table

| user ID | delivery address | change time | surrogate key |
|---|---|---|---|
| Tom | company A | 2021/3/8/08:20 | 1 |
|  | home B | 2021/3/8/08:30 | 2 |
|  | parent's address C | 2021/3/8/08:40 | 3 |

FIG. 4A

DATA PROCESSING METHOD, DATA QUERYING METHOD, AND SERVER DEVICE

CROSS-REFERENCE TO RELATED APPLICATION

This application claims a priority of the Chinese patent application No. 202110280918.6 filed on Mar. 16, 2021, which is incorporated herein by reference in its entirety.

TECHNICAL FIELD

The present disclosure relates to the field of data processing technology, in particular to a data processing method, a server device, and a data querying method for the server device, a data querying method for a client device, a computer device, and a storage medium.

BACKGROUND

Along with the development of Internet as well as the diversification of Internet of Things (IoT) devices and users thereof, more complicated data is generated, an increasingly large data volume needs to be transmitted, and meanwhile the data processing timeliness is highly demanded.

In the related art, when processing, analyzing, querying and maintaining a huge number of complicated data, usually a plurality of data modules with a complicated relationship thereamong is involved, and meanwhile a large quantity of time and storage space needs to be consumed.

SUMMARY

In one aspect, the present disclosure provides in some embodiments a data processing method, including: pulling full data regularly in accordance with a predetermined time, partitioning a Distributed File System (DFS) by date, and storing the full data in a corresponding partition of the DFS; filtering through the full data to obtain incremental data, sorting the incremental data, and storing the sorted data in a dimension table and an event table of a data warehouse detail layer, the dimension table being associated with the event table through a surrogate key; and associating the dimension table with the event table to generate a report, generating an aggregate table in accordance with a predetermined aggregation demand, and storing the generated aggregate table at a reporting layer.

In some possible embodiments of the present disclosure, subsequent to associating the dimension table with the event table to generate the report, generating the aggregate table in accordance with the predetermined aggregation demand and storing the aggregate table at the reporting layer, the data processing method further includes synchronizing the report and the aggregate table to a column-oriented memory database in an incremental manner.

In some possible embodiments of the present disclosure, the dimension table includes a plurality of pieces of dimension data and a change in each piece of dimension data, and the event table includes a plurality of pieces of event data and a change in each piece of event data. The filtering through the full data to obtain the incremental data, sorting the incremental data and storing the sorted data in the dimension table and the event table of the data warehouse detail layer includes: filtering through the full data stored in a corresponding partition of the DFS by date to obtain the incremental data; identifying the incremental data in accordance with preset data types; storing the dimension data in the dimension table sequentially in accordance with lifecycles and an order of change times of the data; generating the surrogate key in accordance with lifecycles of the dimension data; and storing the event data in the event table in accordance with the lifecycles and the change times of the data, and a correspondence between lifecycles of the event data and the surrogate keys.

In some possible embodiments of the present disclosure, the generating the surrogate key in accordance with the lifecycle of the dimension data further includes ranking the lifecycles of the dimension data in accordance with the change times, and taking each serial number as the surrogate key.

In some possible embodiments of the present disclosure, a change frequency of the dimension data is substantially smaller than a preset frequency threshold, and a change frequency of the event data is substantially greater than the preset frequency threshold.

In some possible embodiments of the present disclosure, the filtering through the full data to obtain the incremental data, sorting the incremental data and storing the sorted data in the dimension table and the event table of the data warehouse detail layer further includes sorting historical data in the incremental data, and storing data sorting results in the dimension table and the event table of the data warehouse detail layer respectively.

In some possible embodiments of the present disclosure, the filtering through the full data to obtain the incremental data, sorting the incremental data and storing the sorted data in the dimension table and the event table of the data warehouse detail layer further includes sorting the incremental data, and storing data sorting results in the dimension table and the event table of the data warehouse detail layer respectively.

In another aspect, the present disclosure provides in some embodiments a server device, including a processor, a memory, and a computer program stored in the memory and executed by the processor. The processor is configured to execute the computer program, so as to: pull full data regularly in accordance with a predetermined time, partition a DFS by date, and store the full data in a corresponding partition of the DFS; filter through the full data to obtain incremental data, sorting the incremental data, and store the sorted data in a dimension table and an event table of a data warehouse detail layer, the dimension table being associated with the event table through a surrogate key; and associate the dimension table with the event table to generate a report, generate an aggregate table in accordance with a predetermined aggregation demand, and store the generated aggregate table at a reporting layer.

In some possible embodiments of the present disclosure, subsequent to associating the dimension table with the event table to generate the report, generating the aggregate table in accordance with the predetermined aggregation demand and storing the aggregate table at the reporting layer, the processor is further configured to execute the computer program, so as to synchronize the report and the aggregate table to a column-oriented memory database in an incremental manner.

In some possible embodiments of the present disclosure, the dimension table includes a plurality of pieces of dimension data and a change in each piece of dimension data, and the event table includes a plurality of pieces of event data and a change in each piece of event data. When filtering through the full data to obtain the incremental data, sorting the incremental data and storing the sorted data in the dimension table and the event table of the data warehouse detail layer, the processor is further configured to execute the computer program, so as to: filter through the full data stored in a corresponding partition of the DFS by date to obtain the incremental data; identify the incremental data in accordance with preset data types; store the dimension data in the dimension table sequentially in accordance with lifecycles and an order of change times of the data; generate the surrogate key in accordance with lifecycles of the dimension data; and store the event data in the event table in accordance with the lifecycles and the change times of the data, and a correspondence between lifecycles of the event data and the surrogate keys.

In some possible embodiments of the present disclosure, when generating the surrogate key in accordance with the lifecycle of the dimension data, the processor is further configured to execute the computer program, so as to rank the lifecycles of the dimension data in accordance with the change times, and take each serial number as the surrogate key.

In some possible embodiments of the present disclosure, a change frequency of the dimension data is substantially smaller than a preset frequency threshold, and a change frequency of the event data is substantially greater than the preset frequency threshold.

In some possible embodiments of the present disclosure, when filtering through the full data to obtain the incremental data, sorting the incremental data and storing the sorted data in the dimension table and the event table of the data warehouse detail layer, the processor is further configured to execute the computer program, so as to sort historical data in the incremental data, and store data sorting results in the dimension table and the event table of the data warehouse detail layer respectively.

In some possible embodiments of the present disclosure, when filtering through the full data to obtain the incremental data, sorting the incremental data and storing the sorted data in the dimension table and the event table of the data warehouse detail layer, the processor is further configured to execute the computer program, so as to sort the incremental data, and store data sorting results in the dimension table and the event table of the data warehouse detail layer respectively.

In yet another aspect, the present disclosure provides in some embodiments a data querying method for the above-mentioned server device, including: presenting a report and/or an aggregate table at a reporting layer; querying the report and/or the aggregate table at the reporting layer in response to a query request from a client device, and outputting a query result; and transmitting the query result to the client device.

In some possible embodiments of the present disclosure, the server device further includes a report query circuitry configured to synchronize the report and the aggregate table to the column-oriented memory database in an incremental manner. The querying the report and/or the aggregate table at the reporting layer in response to the query request from the client device and outputting the query result includes querying the report and/or the aggregate table in the column-oriented memory database in response to the query request from the client device and outputting the query result.

In still yet another aspect, the present disclosure provides in some embodiments a data querying method for a client device, including: generating a query request in response to a user's operation, and transmitting the query request to the above-mentioned server device, so that the server device queries data in accordance with a report and/or an aggregate table at a reporting layer, the report and/or the aggregate table being obtained in accordance with a dimension table and an event table of a data warehouse detail layer, the dimension table and the event table being provided for incremental data filtered through from full data stored in a corresponding partition of a DFS by date; and receiving a query result from the server device.

In some possible embodiments of the present disclosure, the server device further includes a report query circuitry configured to synchronize the report and the aggregate table to the column-oriented memory database in an incremental manner. The method further includes generating the query request in response to the user's operation, and transmitting the query request to the server device, so that the server device queries data in accordance with the report and/or the aggregate table in the column-oriented memory database.

In still yet another aspect, the present disclosure provides in some embodiments a non-transitory computer-readable storage medium storing therein a computer program. The computer program is executed by a processor, so as to: pull full data regularly in accordance with a predetermined time, partition a DFS by date, and store the full data in a corresponding partition of the DFS; filter through the full data to obtain incremental data, sort the incremental data, and store the sorted data in a dimension table and an event table of a data warehouse detail layer, the dimension table being associated with the event table through a surrogate key; and associate the dimension table with the event table to generate a report, generate an aggregate table in accordance with a predetermined aggregation demand, and store the generated aggregate table at a reporting layer.

In some possible embodiments of the present disclosure, subsequent to associating the dimension table with the event table to generate the report, generating the aggregate table in accordance with the predetermined aggregation demand and storing the aggregate table at the reporting layer, the computer program is further executed by the processor, so as to synchronize the report and the aggregate table to a column-oriented memory database in an incremental manner.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 1 is a flow chart of a data processing method according to one embodiment of the present disclosure;

FIG. 2 is a schematic view showing a specific example of dimension data according to one embodiment of the present disclosure;

FIG. 3 is a schematic view showing a specific example of event data according to one embodiment of the present disclosure;

FIGS. 4A and 4B are schematic views showing specific example of a dimension table and an event table respectively according to one embodiment of the present disclosure;

FIG. 5 is a block diagram of a server device according to one embodiment of the present disclosure;

DETAILED DESCRIPTION

Figures 4B, 5:
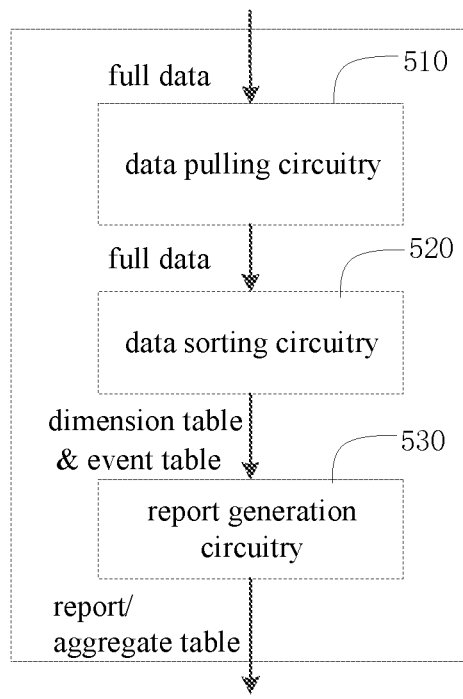

The present disclosure will be described hereinafter in conjunction with the drawings and embodiments. Any identical or similar reference numeral represents an identical or similar element or element. The following embodiments are for illustrative purposes only, but shall not be used to limit the scope of the present disclosure.

In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

In the related art, all business data of a to-be-analyzed business is pulled through synchronizing a database regularly. However, existing data processing relates to a plurality of complex business modules, and the association among the modules is relatively complex, so it is significantly difficult to store the full data, as well as filter through, maintain, process and store incremental data.

An object of the present disclosure is to provide a data processing method, a, server device, a data querying method for the server device, a data querying method for a client device, a computer device and a storage medium, so as to solve the above-mentioned problems completely or partially.

As shown in FIG. 1, the present disclosure provides in some embodiments a data processing method, which includes: pulling full data regularly in accordance with a predetermined time or period of time, partitioning a Distributed File System (DFS) by date, and storing the full data in a corresponding partition of the DFS; filtering through the full data to obtain incremental data, sorting the incremental data, and storing the sorted data in a dimension table and an event table of a data warehouse detail layer, the dimension table being associated with the event table through a surrogate key; and associating the dimension table with the event table to generate a report, generating an aggregate table in accordance with a predetermined aggregation demand, and storing the generated aggregate table at a reporting layer.

According to the embodiments of the present disclosure, the DFS is partitioned, so as to process the full data in a partitioned manner. The incremental data is sorted and stored in the dimension table and the event table associated with each other through the surrogate key, so as to provide effective association while storing the incremental data in accordance with data types. The dimension table is associated with the event table to generate the report, the aggregate table is generated in accordance with the predetermined aggregation demand, and the generated aggregate table is stored at the reporting layer. As a result, it is able to improve data processing efficiency, support data analysis, and solve the problems in the related art where there are many modules/units with a complicated relationship thereamong for the data processing, so the method has a wide application prospect.

In some possible embodiments of the present disclosure, the data processing method is applied to a server device. And the server device is, for example, a local server device or a cloud server device. The data processing method for the server device will be described hereinafter in more details.

S1: pulling full data regularly in accordance with a predetermined time or period of time, partitioning a DFS by date, and storing the full data in a corresponding partition of the DFS.

In this step, the description will be given still by taking a huge quantity of data generated by business processing as an example. In the embodiments of the present disclosure, the business data is processed through creating a data warehouse. To be specific, the data warehouse is created through Hive kit, and the full data is pulled regularly through Hive kit in accordance with the predetermined time or period of time. For example, the full data is pulled at a fixed time point each day and then stored in the DFS.

Considering that the full data has a relatively large data volume, the DFS is partitioned by date, and the pulled full data is stored in a corresponding partition, so as to store the full data in the DFS in an ordered manner, thereby to facilitate the subsequent rapid calling and processing.

In a specific instance, for example, a to-be-analyzed business started from March 1, and business data is processed through the data processing method from March 8. The predetermined time for pulling the full data is 5:00 am, i.e., the full data was pulled from March 8 at 5:00 am each day. To be specific, the full data pull on March 8 includes data generated from March 1 to March 8, and this data is historical data and incremental data. The DFS is partitioned by date, and the full data pulled on March 8 was stored in a partition named "2021/03/08". Similarly, the full data pulled on March 9 includes data generated from March 1 to March 9, and it was stored in another partition named "2021/03/09" in the DFS by date.

It should be appreciated that, the time for regularly pulling the full data will not be particularly defined herein. For example, the full data is pulled once a month, and sorted on the basis of this time period. The specific time for pulling the data will be selected according to the practical need.

Through the above, it is able to store the full data in an ordered manner in the DFS, thereby to facilitate the subsequent calling, and accelerate a storage speed.

It should be appreciated that, the full data in the embodiments of the present disclosure include all data, or a part of data, of the to-be-analyzed business, which will not be particularly defined herein. Correspondingly, the full data shall be set according to the practical need so as to meet such a design criterion that the incremental data is included and data integrity is ensured.

S2: filtering through the full data to obtain incremental data, sorting the incremental data, and storing the sorted data in a dimension table and an event table of a data warehouse detail layer, the dimension table being associated with the event table through a surrogate key.

In this step, the filtered incremental data is sorted and associated, so as to store the incremental data in accordance with its types. In addition, the dimension table is associated with the event table, so as to facilitate the subsequent calling.

In the embodiments of the present disclosure, the incremental data is filtered through from the corresponding full data in accordance with a name of the partition of the DFS. For example, the incremental data in the partition "2021/03/09" is determined in accordance with the partition names "2021/03/08" and "2021/03/09", and data generated from 5:00 am on March 8 to 5:00 am on March 9 is filtered through from the data generated from March 1 to March 9 in the partition "2021/03/09" as the incremental data.

In some possible embodiments of the present disclosure, the dimension table includes a plurality of pieces of dimension data and a change in each piece of dimension data, and the event table includes a plurality of pieces of event data and a change in each piece of event data.

In the embodiments of the present disclosure, information about all changes in the dimension data of one event from the beginning to a current state is recorded in the dimension table. For example, a start time and an end time of the dimension data is recorded in the dimension table in the form of a table. At the beginning, a creation time of the dimension data is a start time, and the end time is set as infinite. When a content field of a piece of dimension data changes, the end time is set as a current modification time, and it means that this piece of dimension data has ended and the modified dimension data is taken as a new record. In this regard, historical full data of this piece of dimension data and up-to-date data are included in the table. In other words, a lifecycle of each piece of dimension data is recorded in the dimension table, and one record corresponds to a lifecycle of one piece of dimension data. For example, when one piece of dimension data is set as A at the start time, changed to B at a time 1, and changed to C at a time 2, a lifecycle of the dimension data A is from the start time to the time 1, a lifecycle of the dimension data B is from the time 1 to the time 2, and a lifecycle of the dimension data C is from the time 2 to a time when the dimension data C is changed again.

It should be appreciated that, in the embodiments of the present disclosure, the dimension data is data with a low change frequency, e.g., attribute data, or data whose change frequency is smaller than a preset frequency threshold. When the frequency threshold is once a day, and the change frequency of a piece of data is smaller than the frequency threshold, the data is set as dimension data; otherwise, it is set as event data. The dimension table is mainly used to record the dimension data with a low change frequency, e.g., historical snapshot information about the dimension data at a certain time point or within a certain time period is capable of being viewed through the dimension table.

In the embodiments of the present disclosure, the event table is used to record a change in each piece of event data, e.g., each event. A lifecycle and a change time of each piece of event data is recorded in the form of a table.

It should be appreciated that, the dimension data and the event data ire set according to the practical need, so as to meet such a design criterion as to achieve functions of the dimension table and the event table, which will not be particularly defined herein.

In some possible embodiments of the present disclosure, step S2 further includes sorting the incremental data, and storing the sorted data in the dimension table and the event table of the data warehouse detail layer.

In the embodiments of the present disclosure, the incremental data is identified and sorted in accordance with preset data types. For example, the data types are determined in accordance with a change frequency of each piece of data in the incremental data.

In some possible embodiments of the present disclosure, step S2 includes the following steps.

S21: filtering through the full data stored in a corresponding partition of the DFS by date, so as to obtain the increment data.

In some possible embodiments of the present disclosure, step S2 further includes sorting historical data in the incremental data, and storing data sorting results in the dimension table and the event table of the data warehouse detail layer respectively.

In a specific instance, still taking the above-mentioned to-be-analyzed business as an example, the data processing is performed from March 8, so the full data generated from March 1 to March 8 and pulled on March 8 is historical data and incremental data, i.e., all the data generated from the beginning is processed.

In another specific instance, still taking the above-mentioned to-be-analyzed business as an example, the full data pulled on March 9 includes the data generated from March 1 to March 9, and the incremental data generated from March 8 to March 9 is filtered through from the full data stored in the partition "2021/03/09" in accordance with the partition names "2021/03/08" and "2021/03/09" in the DFS.

S22: identifying the incremental data in accordance with the preset data types.

Further, the incremental data generated from March 8 to March 9 is identified in accordance with the data types. In a specific instance, the data types include event data which changes frequently and dimension data which does not change frequently. Hence, the incremental data is identified and sorted into dimension data and event data. To be specific, the change frequency of the dimension data is substantially smaller than the change frequency of the event data.

An order record for a store on AliExpress website is taken as an example of the to-be-analyzed business. For example, data of a record includes user ID-"Tom", delivery address-"company A", and detail-"purchasing bookshelf". The dimension data which does not change frequently includes "user ID" and "delivery address", and the event data which changes frequently includes "detail". Hence, each piece of data is identified and sorted into the dimension data or event data, and then stored in accordance with the data type.

S23: storing the dimension data in the dimension table sequentially in accordance with a lifecycle and a change time of the data.

The dimension data does not change frequently, so the dimension table is used to store the lifecycle and the change time of each piece of dimension data. For example, in the incremental data, the delivery address for the user "Tom" is changed from "company A" to "home B", and then to "parent's address C", and order data is generated from different delivery addresses. The delivery address is one piece of dimension data, and when it is changed from company A to home B, in the dimension table, a current record of this piece of dimension data is ended and another new record is added, i.e., an end time of the delivery address "company A" is a time when the delivery address is changed to "home B". At the same time, a record is added for the dimension data, i.e., the delivery address, and this record is generated with the delivery address as "home B". When the delivery address is modified again, e.g., it is modified into "parent's address C", the record with the delivery address as "home B" is ended, and a record with the delivery address as "parent's address C" starts.

Through the dimension table, it is able to rapidly store the lifecycle and the change time of each piece of dimension data. FIG. 2 shows the change time and the lifecycle of the dimension data about the delivery address.

S24: generating the surrogate key in accordance with the lifecycle of each piece of dimension data.

In the embodiments of the present disclosure, in order to associate the dimension table with the event table, the surrogate key is generated in accordance with the lifecycle of the dimension data with a low change frequency, i.e., the surrogate key is a variant for identifying the change in each piece of dimension data. In a specific instance, FIG. 3 shows order data about the user "Tom" in the incremental data. As shown in FIG. 3, the dimension data "delivery address" is changed by the user "Tom", and meanwhile the event data "detail" changes due to purchasing operations at different delivery addresses. The incremental data has a large data volume, and there exists redundancy information, so it is difficult to process the data.

In the embodiments of the present disclosure, the dimension data and the event data are stored in the dimension table and the event table respectively in accordance with the data types, and meanwhile the dimension data is associated with the event data through the surrogate key. In this way, it is able to record each piece of event data, and prevent the dimension data from being stored repeatedly. In a specific instance, as shown in FIGS. 4A and 4B, the change in the dimension data "delivery address" is associated with the event data "detail", and the surrogate key for "detail" is generated in accordance with the lifecycle of "delivery address". A plurality of pieces of changed dimension data "delivery address" and surrogate keys are recorded in the dimension table. In addition, the surrogate keys as well as "detail" for each "delivery address" and "update time" corresponding to each surrogate key are clearly recorded in the event table. As a result, it is able to associate the event data with the dimension data through the surrogate keys.

In the embodiments of the present disclosure, through the surrogate keys, it is unnecessary to store the dimension information repeatedly when dimension attributes are involved in the event table. Instead, it is able to store the dimension information correspondingly through the surrogate keys through which the dimension data is associated with the event data. In this way, it is able to significantly save a memory space.

In some possible embodiments of the present disclosure, the generating the surrogate key in accordance with the lifecycle of the dimension data further include ranking lifecycles of the dimension data in accordance with the change times, and taking a serial number as the surrogate key.

As shown in FIG. 4A, not only the dimension data and the change time of the dimension data but also the surrogate key for identifying the lifecycle of the dimension data are stored in the dimension table. The lifecycles of the dimension data are ranked in accordance with update times of the dimension data, so as to obtain the surrogate keys. For example, serial numbers which change in an auto-incremental manner are taken as the surrogate keys, so as to further enhance the association of the dimension data with the event data while improving the utilization of the storage space. In the embodiments, the serial numbers are taken as the surrogate keys and named uniformly. For example, surrogate keys 1, 2 and 3 are set for the pieces of dimension data "company A", "home B" and "parent's address C" respectively, i.e., the surrogate keys are created in an auto-incremental manner in accordance with the lifecycles of the dimension data "delivery address", so as to facilitate the identification and the processing.

S25: storing the event data sequentially in the event table in accordance with the lifecycles and the change times of the data, and a correspondence between lifecycles of the event data and the surrogate keys.

In the embodiments of the present disclosure, the event data corresponding to the surrogate key is stored in the event table in accordance with the surrogate key representing the association and the dimension data stored in the dimension table. Because the event data changes frequently, the event data is stored in an ordered manner in accordance with the lifecycle, the change time and the correspondence between the lifecycles of the event data and the surrogate keys.

In a specific instance, as shown in FIG. 4B, the event data is stored in the event table, and as compared with FIG. 3, no dimension data is included. In addition, the volume of the event data is reduced through the surrogate keys. Upon retrieving the data, the dimension data is associated with the event data through the surrogate keys, so it is able to improve the data processing efficiency, improve the data association, and reduce an occupied memory space.

It should be further appreciated that, the above description is merely for illustrative purposes, and in actual use, the obtained full data is more complex. For example, the incremental data about computer devices includes a change in the quantity of the devices, distribution of types of the devices, an active trend of each device, a resource utilization condition, etc. The incremental data about various on-line education systems includes plans, programs, materials, templates, etc. The incremental data about a distributed organization terminal includes user attributes, user demands, organization attributes, organization distribution, etc. More complicatedly, the association between the dimension data and the event data includes association between devices and organizations, between plans and labels, between plans and programs, between plans and planned play beginning and ending times, between plans and organizations, between programs and labels, between programs and materials, between programs and organizations, between materials and labels, between materials and organizations, between templates and organizations, between users and organizations, etc. Hence, in the embodiments of the present disclosure, after identifying the incremental data, the dimension data is associated with the event data in accordance with the data types, and the surrogate key is generated in accordance with the change in the dimension data, so as to effectively control the storage space while ensuring the association, and improve the data processing speed.

S3: associating the dimension table with the event table to generate a report, generating an aggregate table in accordance with a predetermined aggregation demand, and storing the generated aggregate table at a reporting layer.

Through sorting the incremental data into the dimension data and the event data and associating the dimension data with the event data, it is able to rapidly retrieve the data and directly display the data in a user-oriented manner. For example, at the reporting layer, the dimension data in the dimension table and the event data in the event data are called so as to generate the report about the incremental data, thereby to facilitate the data presentation. In addition, at the reporting layer, the aggregate table is generated in accordance with the predetermined aggregation demand, so as to facilitate the data analysis and the data presentation. The aggregation demand includes analysis items set in accordance with an analysis demand on the business data of the to-be-analyzed business. For example, the data are aggregated in accordance with categories of purchased articles in "detail", e.g., the data about groceries is aggregated, and the data about food is aggregated, so as to achieve the data analysis and the data presentation in a more intuitive manner.

Figure 10:
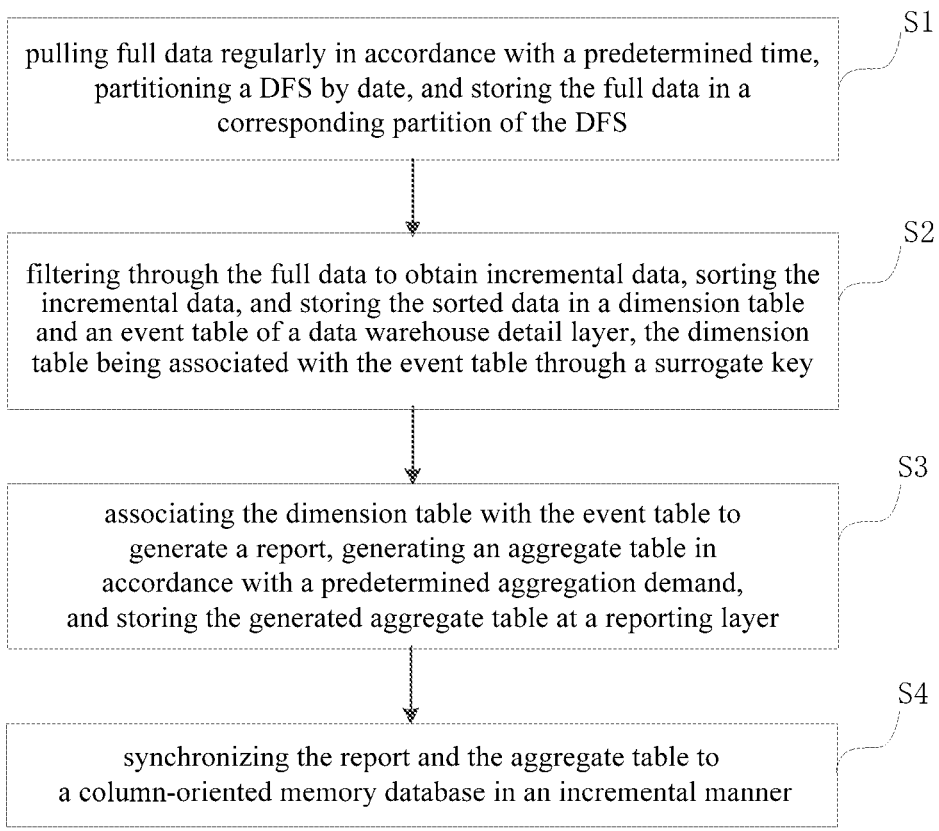
FIG. 10 is another flow chart of the data processing method according to one embodiment of the present disclosure.

In some possible embodiments of the present disclosure, subsequent to associating the dimension table with the event table to generate the report, generating the aggregate table in accordance with the predetermined aggregation demand and storing the aggregate table at the reporting layer, as shown in FIG. 10, the data processing method further includes step S4 of synchronizing the report and the aggregate table to a column-oriented memory database in an incremental manner.

Considering that it is impossible for the reporting layer created on the basis of a Hive kit tooling component to rapidly respond to a query instruction from a user, in the embodiments of the present disclosure, the report and the aggregate table at the reporting layer are synchronized to the column-oriented memory database clickhouse. The column-oriented memory database supports quick query, so it is able to output the report or the aggregate table to a client device within a time at a millisecond level in response to the query instruction from the client device, thereby to further improve the user experience.

Corresponding to the above-mentioned data processing method, as shown in FIG. 5, the present disclosure further provides in some embodiments a server device for implementing the above-mentioned data processing method, which includes: a data pulling circuitry 510 configured to pull full data regularly in accordance with a predetermined time, partition a DFS by date, and store the full data in a corresponding partition of the DFS; a data sorting circuitry 520 configured to filter through the full data to obtain incremental data, sort the incremental data, and store the sorted data in a dimension table and an event table of a data warehouse detail layer, the dimension table being associated with the event table through a surrogate key; and a report generation circuitry 530 configured to associate the dimension table with the event table to generate a report, generate an aggregate table in accordance with a predetermined aggregation demand, and store the generated aggregate table at a reporting layer.

According to the embodiments of the present disclosure, the data pulling circuitry 510 is configured to partition the DFS so as to process the full data on a partition basis. The data sorting circuitry 520 is configured to store the incremental data in the dimension table and the event table associated with the dimension table through the surrogate key, so as to provide effective association while storing the incremental data in accordance with the data types. The report generation circuitry 530 is configured to associate the dimension table with the event table to generate the report, generate the aggregate table in accordance with the predetermined aggregation demand and store the generated aggregate table at the reporting layer. As a result, it is able to improve data processing efficiency, support data analysis, and solve the problems in the related art where there are many modules with a complicated relationship thereamong for the data processing, so the server device has a wide application prospect.

In some possible embodiments of the present disclosure, the server device further includes a report query circuitry configured to synchronize the report and the aggregate table to a column-oriented memory database in an incremental manner. In the embodiments of the present disclosure, the report and the aggregate table stored at the reporting layer are synchronized to the column-oriented memory database having a function of supporting the storage and query of a large quantity of reports, so it is able to rapidly query the report and the aggregate table.

The server device in the embodiments of the present disclosure corresponds to the above-mentioned data processing method, so the implementation of the server device may refer to that of the data processing method and thus will not be particularly defined herein.

Figure 6:
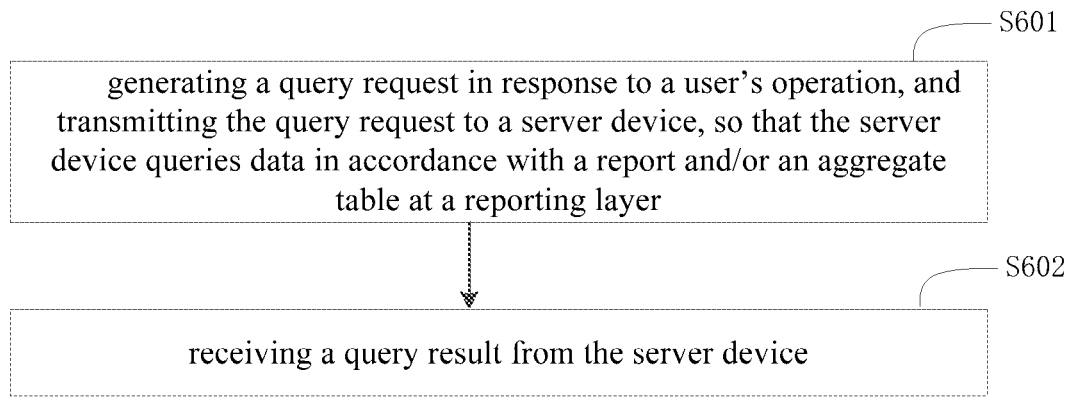
FIG. 6 is a flow chart of a data querying method for a client device according to one embodiment of the present disclosure.

As shown in FIG. 6, the present disclosure further provides in some embodiments a data querying method for a client device, which includes: step S601 of generating a query request in response to a user's operation, and transmitting the query request to the above-mentioned server device, so that the server device queries data in accordance with a report and/or an aggregate table at a reporting layer, the report and/or the aggregate table being obtained in accordance with a dimension table and an event table of a data warehouse detail layer, the dimension table and the event table being provided for incremental data filtered through from full data stored in a corresponding partition of a DFS by date; and step S602 of receiving a query result from the server device.

In a specific instance, the user is a seller on AliExpress website, and order data about a user's shop on AliExpress website each year is stored in the server device. The user needs to query a category of a best seller each month. Based on this need, a predetermined aggregation demand is set by the user, and the above-mentioned data processing method is executed by the server device, so as to filter through the incremental data each month from the full data stored in a corresponding partition of the DFS by date, identify and sort the incremental data to obtain the dimension table and the event table associated with each other, and generate the aggregate table in accordance with the dimension table and the event table for query.

In another specific instance, the server device further generates the report and stores the report at the reporting layer.

Figure 7:
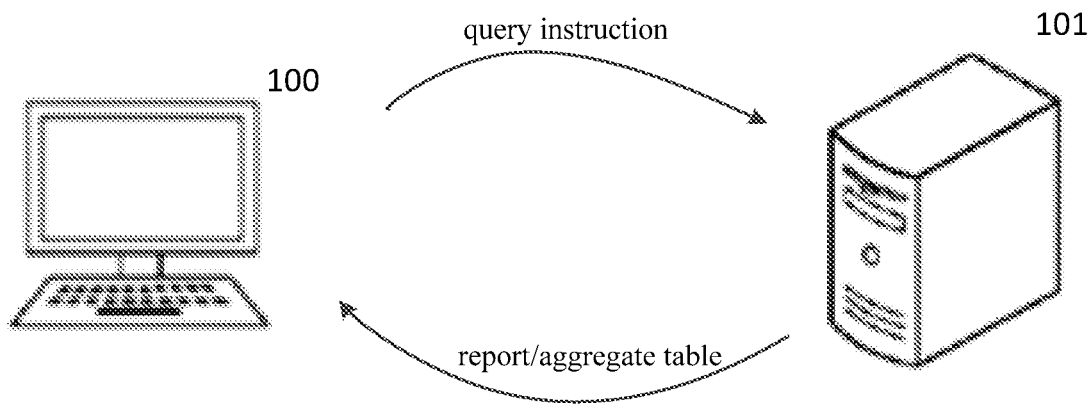
FIG. 7 is a schematic view showing the data querying method for the client device according to one embodiment of the present disclosure.

As shown in FIG. 7, when the user outputs a query instruction through a computer 100 in early April, the query instruction is uploaded to the server device 101, and then the server device queries the stored aggregate table in accordance with the query instruction, and outputs the obtained aggregate table.

In yet another specific instance, when the user needs to count all the orders, the server device 101 is further configured to query the stored reports in accordance with the query instruction, and output the reports. The query result is received by the user from the server device 101 through the computer 100.

According to the embodiments of the present disclosure, through querying the data using the method, it is able to obtain a data analysis result in time, solve the problem in the related art where a plurality of data modules with a complicated relationship is involved when performing the data analysis through a database, and simplify a data processing procedure and data processing architecture of the server device, so the method has a wide application prospect.

In some possible embodiments of the present disclosure, the server device further includes a report query circuitry configured to synchronize the report and the aggregate table to a column-oriented memory database in an incremental manner. The method further includes generating the query request in response to the user's operation, and transmitting the query request to the server device, so that the server device queries data in accordance with the report and/or the aggregate table in the column-oriented memory database.

In the embodiments of the present disclosure, the report and the aggregate table generated at the reporting layer are synchronized to the column-oriented memory database having a function of supporting the storage and query of a large quantity of reports, so it is able to rapidly query the report and the aggregate table in response to the user's query request.

In a specific instance, the server device obtains various data from an information distribution system, e.g., monitoring data, distribution information, plans and schemes. At the client device, the user outputs various query instructions, so as to retrieve a play content, a play date and a play time period of the monitoring data, thereby to fully meet the play demand of the user. In another specific instance, the server device supports a single-client distribution mode and a multi-group distribution mode.

Figure 8:
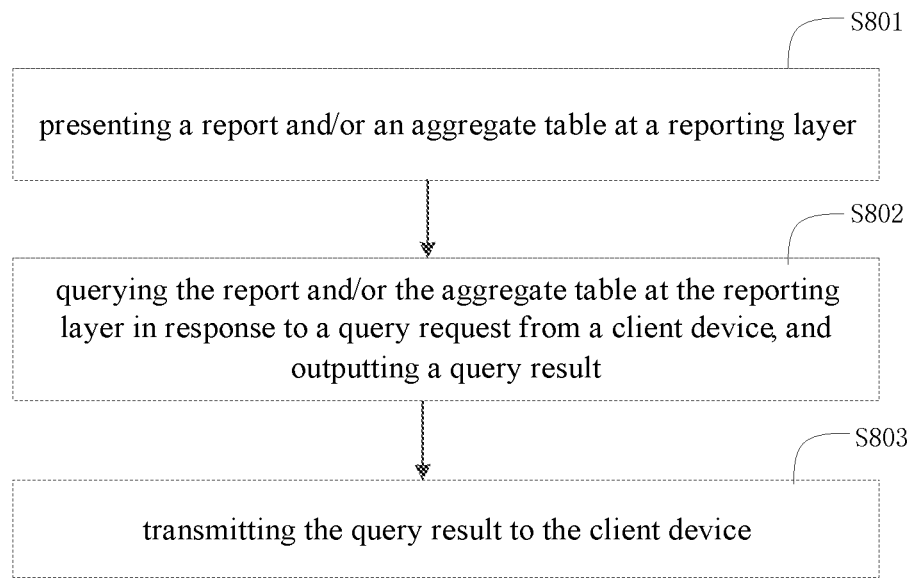
FIG. 8 is a flow chart of a data querying method for a server device according to one embodiment of the present disclosure.

As shown in FIG. 8, the present disclosure further provides a data querying method for the above-mentioned server device, which includes: S801 of presenting a report and/or an aggregate table at a reporting layer; S802 of querying the report and/or the aggregate table at the reporting layer in response to a query request from a client device, and outputting a query result; and S803 of transmitting a query result; and transmitting the query result to the client device.

Still taking the seller on AliExpress website as an example, the above-mentioned data processing method is executed by the server device, so as to filter through the incremental data each month from the full data stored in a corresponding partition of the DFS, identify and sort the incremental data to obtain the dimension table and the event table associated with each other, and generate the aggregate table in accordance with the dimension table and the event data for query.

In a specific instance, the aggregate table at the reporting layer is presented by the server device, while in another specific instance, the report is generated and presented by the server device.

When the user needs to query the data, the report and the aggregate table stored at the reporting layer are queried by the server device in response to the query request, and then the query result is outputted to the client device.

According to the embodiments of the present disclosure, through querying the data, it is able to obtain a data analysis result in time, solve the problem in the related art where a plurality of data modules with a complicated relationship is involved when performing the data analysis through a database, and simplify a data processing procedure and data processing architecture of the server device, so the method has a wide application prospect.

In some possible embodiments of the present disclosure, the server device further includes a report query circuitry configured to synchronize the report and the aggregate table to a column-oriented memory database in an incremental manner. The querying the report and/or the aggregate table at the reporting layer in response to the query request from the client device and outputting the query result includes querying the report and/or the aggregate table in the column-oriented memory database in response to the query request from the client device and outputting the query result.

In the embodiments of the present disclosure, the report and the aggregate table generated at the reporting layer are synchronized by the server device to the column-oriented memory database having a function of supporting the storage and query of a large quantity of reports, so it is able to rapidly query the report and the aggregate table in response to the user's query request.

The data querying method for the server device in the embodiments of the present disclosure corresponds to the above-mentioned data querying method for the client device, so the implementation of the data querying method for the server device may refer to that mentioned hereinabove and thus will not be particularly defined herein.

The present disclosure further provides in some embodiments a computer-readable storage medium storing therein a computer program. The computer program is executed by a processor, so as to: pull full data regularly in accordance with a predetermined time, partition a DFS by date, and store the full data in a corresponding partition of the DFS; filter through the full data to obtain incremental data, sort the incremental data, and store the sorted data in a dimension table and an event table of a data warehouse detail layer, the dimension table being associated with the event table through a surrogate key; and associate the dimension table with the event table to generate a report, generate an aggregate table in accordance with a predetermined aggregation demand, and store the generated aggregate table at a reporting layer.

In some possible embodiments of the present disclosure, the computer program is further executed by the processor, so as to: present the report and/or the aggregate table at the reporting layer; query the report and/or the aggregate table at the reporting layer in response to a query request from a client device, and output a query result; and transmit the query result to the client device.

In another possible embodiment of the present disclosure, the computer program is further executed by the processor, so as to: generate the query request in response to a user's operation, and transmit the query request to the server device, so that the server device queries data in accordance with the report and/or the aggregate table at the reporting layer, the report and/or the aggregate table being obtained in accordance with the dimension table and the event table of the data warehouse detail layer, the dimension table and the event table being provided for incremental data filtered through from full data stored in a corresponding partition of a DFS by date; and receive the query result from the server device.

The computer program stored in the storage medium is selected according to the practical need, so as to implement the above-mentioned methods when the computer program is executed by the processor.

In actual use, the computer-readable storage medium may include one computer-readable medium or a combination of more than one computer-readable media. The computer-readable medium may be a computer-readable signal medium or a computer-readable storage medium. The computer-readable storage medium includes, but not limited to, an electronic, magnetic, optical, electromagnetic, infrared, or semiconductor system, device or apparatus, or any suitable combination thereof. A more specific example (a non-exhaustive list) of the computer-readable storage medium includes an electrical connection having one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof. In the embodiments of the present disclosure, the computer-readable storage medium may be any physical medium including or storing therein a program, and the program may be used by, or in conjunction with, an instruction execution system, device or apparatus.

The computer-readable signal medium may include a data signal propagated in a baseband or as a part of a carrier, and it may carry a computer-readable program code. The data signal may be in various forms, which include, but not limited to, electromagnetic signal, optical signal or any suitable combination thereof. The computer-readable signal medium may also be any computer-readable medium other than the computer-readable storage medium, and it may be used to transmit or propagate any program used by, or in conjunction with, an instruction execution system, device or apparatus.

The program code included in the computer-readable medium may be transmitted via any suitable medium, which includes, but not limited to, wireless form, electric wire, optical cable, Radio Frequency (RF), or any suitable combination thereof.

The computer program code for executing the operations in the embodiments of the present disclosure may be written in one or more program design languages, which includes an object-oriented program design language, e.g., Java, Smalltalk or C++, or a conventional procedural program design language, e.g., C language or the like. The program code may be completely or partially executed on a subscriber computer, or executed as a separate software package, or partially executed on the subscriber computer and partially executed on a remote computer, or completely executed on the remote computer or server device. In a situation where the remote computer is involved, the remote computer may be connected to the subscriber computer via any kind of network, e.g., Local Access Network (LAN) or Wide Area Network (WAN), or connected to an external computer (e.g., via Internet from an Internet service provider).

Figure 9:
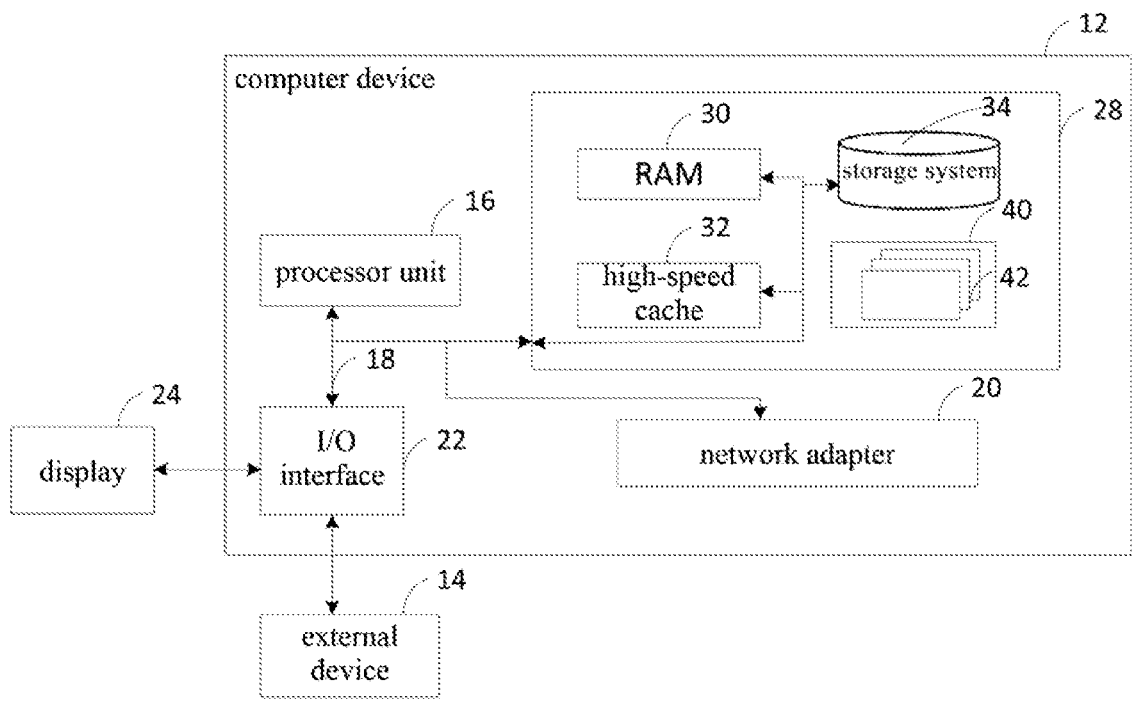
FIG. 9 is a schematic view showing a computer device according to one embodiment of the present disclosure.

As shown in FIG. 9, the present disclosure further provides in some embodiments a computer device 12. The computer device 12 in FIG. 9 is merely for illustrative purposes, but shall not be used to limit the function and application scope of the present disclosure.

As shown in FIG. 9, the computer device 12 is presented in the form of a general-purpose computing device. Components of the computer device 12 include, but not limited to, one or more processors or processing units 16, a system memory 28, and a bus 18 for connecting different system components (including the system memory 28 and the processing unit 16).

The bus 18 has one or more of several bus structures, including a memory bus or memory controller, a peripheral bus, an accelerated graphics port, a processor, or a local bus having any of a plurality of bus structures. For example, these bus structures include, but not limited to, Industry Standard Architecture (ISA) bus, Micro Channel Architecture (MCA) bus, enhanced ISA bus, Video Electronics Standards Association (VESA) local bus and Peripheral Component Interconnect (PCI) bus.

Typically, the computer device 12 includes various computer-readable mediums, which may be any available medium accessible to the computer device 12, and which may include volatile or non-volatile medium, mobile or immobile medium.

The system memory 28 may include a computer-readable medium in the form of a volatile memory, e.g., an RAM 30 and/or a high-speed cache memory 32. The computer device 12 may further include any other mobile/immobile, volatile/non-volatile computer-readable storage medium. Illustratively, the memory system 34 may be used to read data from, or write data into, an immobile, non-volatile magnetic medium (not shown in FIG. 9, which is usually called as hard disk driver). Although not shown in FIG. 9, an magnetic disk driver for reading data from, or writing data into, a mobile, non-volatile magnetic disk (e.g., floppy disk) and an optical disk driver for reading data from, or writing data into, a mobile, non-volatile optical disk (e.g., CD-ROM, DVD-ROM or any other optical medium) may be provided. In these cases, each driver may be coupled to the bus 18 via one or more data medium interfaces. The memory 28 may include at least one program product which includes a group of (e.g., at least one) program module, and these program modules are configured to achieve the functions in the embodiments of the present disclosure.

A program/utility tool 40 having a group of (at least one) program module 42 may be stored in the memory 28, and these program modules 42 include, but not limited to, operating system, one or more application programs, other program modules and program data. Each or one combination of these instances may include the implementation of a network environment. The program module 42 is usually configured to achieve the functions and/or methods in the embodiments of the present disclosure.

The computer device 12 may also communicate with one or more external devices 14 (e.g., keyboard, pointing device or display 24), one or more devices configured to enable the user to interact with the computer device 12, and/or any other device (e.g., network card or Modem) configured to enable the computer device 12 to communicate with one or more other computing devices. This communication may be performed through an Input/Output (I/O) interface 22. In addition, the computer device 12 may also communicate with one or more networks (e.g., LAN, WAN and/or a public network such as Internet) via network adapter 20. As shown in FIG. 9, the network adapter 20 communicates with the other modules of the computer device 12 via the bus 18. It should be appreciated that, although not shown in FIG. 9, the other hardware and/or software modules may be used in conjunction with the computer device 12, which include, but not limited to, microcode, device driver, redundant processing unit, external magnetic driver array, Redundant Array of Independent Disks (RAID) system, magnetic tape driver and data backup storage system.

The processing unit 16 may execute the program stored in the system memory 28, so as to perform various function applications and data processing, e.g., implement the data processing method, the data querying method for the server device, and the data querying method for the client device in the embodiments of the present disclosure.

It should be appreciated that, an order of the steps in the above-mentioned method may be adjusted appropriately, and some steps may be added or deleted according to the practical need. A person skilled in the art may make further modifications and improvements without departing from the spirit of the present disclosure, and these modifications and improvements shall also fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data processing method, comprising:
pulling full data regularly in accordance with a predetermined time, partitioning a Distributed File System (DFS) by date, and storing the full data in a corresponding partition of the DFS;

filtering through the full data to obtain incremental data, sorting the incremental data, and storing the sorted data in a dimension table and an event table of a data warehouse detail layer, the dimension table being associated with the event table through a surrogate key, wherein fields of the dimension table comprises (i) one or more fields associated with user attributes, (ii) one or more fields regarding change times of the user attributes, and (iii) one or more fields about the surrogate key obtained by ranking lifecycles of the user attributes in accordance with the change times of the user attributes; and wherein fields of the event table comprises (iv) one or more fields about the surrogate key, (v) one or more fields about event details, and (vi) one or more fields regarding update times of the event details; and wherein the surrogate key is used to realize an association between changes of the user attributes and updates of the event details; and associating the dimension table with the event table to generate a report, generating an aggregate table in accordance with a predetermined aggregation demand, and storing the generated aggregate table at a reporting layer.

2. The data processing method according to claim 1, wherein subsequent to associating the dimension table with the event table to generate the report, generating the aggregate table in accordance with the predetermined aggregation demand and storing the aggregate table at the reporting layer, the data processing method further comprises synchronizing the report and the aggregate table to a column-oriented memory database in an incremental manner.

3. The data processing method according to claim 1, wherein the dimension table comprises a plurality of pieces of dimension data and a change in each piece of dimension data, and the event table comprises a plurality of pieces of event data and a change in each piece of event data, wherein the filtering through the full data to obtain the incremental data, sorting the incremental data and storing the sorted data in the dimension table and the event table of the data warehouse detail layer comprises:

filtering through the full data stored in a corresponding partition of the DFS by date to obtain the incremental data;

identifying the incremental data in accordance with preset data types;

storing the dimension data in the dimension table sequentially in accordance with lifecycles and an order of change times of the data;

generating the surrogate key in accordance with lifecycles of the dimension data; and storing the event data in the event table in accordance with the lifecycles and the change times of the data, and a correspondence between lifecycles of the event data and the surrogate keys.

4. The data processing method according to claim 3, wherein the generating the surrogate key in accordance with the lifecycle of the dimension data further comprises ranking the lifecycles of the dimension data in accordance with the change times, and taking each serial number as the surrogate key.

5. The data processing method according to claim 3, wherein a change frequency of the dimension data is substantially smaller than a preset frequency threshold, and a change frequency of the event data is substantially greater than the preset frequency threshold.

6. The data processing method according to claim 1, wherein the filtering through the full data to obtain the incremental data, sorting the incremental data and storing the sorted data in the dimension table and the event table of the data warehouse detail layer further comprises sorting historical data in the incremental data, and storing data sorting results in the dimension table and the event table of the data warehouse detail layer respectively.

7. The data processing method according to claim 1, wherein the filtering through the full data to obtain the incremental data, sorting the incremental data and storing the sorted data in the dimension table and the event table of the data warehouse detail layer further comprises sorting the incremental data, and storing data sorting results in the dimension table and the event table of the data warehouse detail layer respectively.

8. A server device, comprising a processor, a memory, and a computer program stored in the memory and executed by the processor, wherein the processor is configured to execute the computer program, so as to:

pull full data regularly in accordance with a predetermined time, partition a Distributed File System (DFS) by date, and store the full data in a corresponding partition of the DFS;

filter through the full data to obtain incremental data, sort the incremental data, and store the sorted data in a dimension table and an event table of a data warehouse detail layer, the dimension table being associated with the event table through a surrogate key, wherein fields of the dimension table comprises (i) one or more fields associated with user attributes, (ii) one or more fields regarding change times of the user attributes, and (iii) one or more fields about the surrogate key obtained by ranking lifecycles of the user attributes in accordance with the change times of the user attributes; and wherein fields of the event table comprises (iv) one or more fields about the surrogate key, (v) one or more fields about event details, and (vi) one or more fields regarding update times of the event details; and wherein the surrogate key is used to realize an association between changes of the user attributes and updates of the event details; and associate the dimension table with the event table to generate a report, generate an aggregate table in accordance with a predetermined aggregation demand, and store the generated aggregate table at a reporting layer.

9. The server device according to claim 8, wherein subsequent to associating the dimension table with the event table to generate the report, generating the aggregate table in accordance with the predetermined aggregation demand and storing the aggregate table at the reporting layer, the processor is further configured to execute the computer program, so as to synchronize the report and the aggregate table to a column-oriented memory database in an incremental manner.

10. The server device according to claim 8, wherein the dimension table comprises a plurality of pieces of dimension data and a change in each piece of dimension data, and the event table comprises a plurality of pieces of event data and a change in each piece of event data, wherein when filtering through the full data to obtain the incremental data, sorting the incremental data and storing the sorted data in the dimension table and the event table of the data warehouse detail layer, the processor is further configured to execute the computer program, so as to:

filter through the full data stored in a corresponding partition of the DFS by date to obtain the incremental data;

identify the incremental data in accordance with preset data types;

store the dimension data in the dimension table sequentially in accordance with lifecycles and an order of change times of the data;

generate the surrogate key in accordance with lifecycles of the dimension data; and store the event data in the event table in accordance with the lifecycles and the change times of the data, and a correspondence between lifecycles of the event data and the surrogate keys.

11. The server device according to claim 10, wherein when generating the surrogate key in accordance with the lifecycle of the dimension data, the processor is further configured to execute the computer program, so as to rank the lifecycles of the dimension data in accordance with the change times, and take each serial number as the surrogate key.

12. The server device according to claim 10, wherein a change frequency of the dimension data is substantially smaller than a preset frequency threshold, and a change frequency of the event data is substantially greater than the preset frequency threshold.

13. The server device according to claim 8, wherein when filtering through the full data to obtain the incremental data, sorting the incremental data and storing the sorted data in the dimension table and the event table of the data warehouse detail layer, the processor is further configured to execute the computer program, so as to sort historical data in the incremental data, and store data sorting results in the dimension table and the event table of the data warehouse detail layer respectively.

14. The server device according to claim 8, wherein when filtering through the full data to obtain the incremental data, sorting the incremental data and storing the sorted data in the dimension table and the event table of the data warehouse detail layer, the processor is further configured to execute the computer program, so as to sort the incremental data, and store data sorting results in the dimension table and the event table of the data warehouse detail layer respectively.

15. A data querying method performed by the server device according to claim 8, comprising:

presenting a report and/or an aggregate table at a reporting layer;

querying the report and/or the aggregate table at the reporting layer in response to a query request from a client device, and outputting a query result; and transmitting the query result to the client device.

16. The data querying method according to claim 15, wherein the server device further comprises a report query circuitry configured to synchronize the report and the aggregate table to the column-oriented memory database in an incremental manner, and the querying the report and/or the aggregate table at the reporting layer in response to the query request from the client device and outputting the query result comprises querying the report and/or the aggregate table in the column-oriented memory database in response to the query request from the client device and outputting the query result.

17. A data querying method for a client device, comprising:

generating a query request in response to a user's operation, and transmitting the query request to the server device according to claim 8, so that the server device queries data in accordance with a report and/or an aggregate table at a reporting layer, the report and/or the aggregate table being obtained in accordance with a dimension table and an event table of a data warehouse detail layer, the dimension table and the event table being provided for incremental data filtered through from full data stored in a corresponding partition of a Distributed File System (DFS) by date; and receiving a query result from the server device.

18. The data querying method according to claim 17, wherein the server device further comprises a report query circuitry configured to synchronize the report and the aggregate table to the column-oriented memory database in an incremental manner, wherein the data querying method further comprises generating the query request in response to the user's operation, and transmitting the query request to the server device, so that the server device queries data in accordance with the report and/or the aggregate table in the column-oriented memory database.

19. A non-transitory computer-readable storage medium storing therein a computer program, wherein the computer program is executed by a processor, so as to:

pull full data regularly in accordance with a predetermined time, partition a Distributed File System (DFS) by date, and store the full data in a corresponding partition of the DFS;

filter through the full data to obtain incremental data, sort the incremental data, and store the sorted data in a dimension table and an event table of a data warehouse detail layer, the dimension table being associated with the event table through a surrogate key, wherein fields of the dimension table comprises (i) one or more fields associated with user attributes, (ii) one or more fields regarding change times of the user attributes, and (iii) one or more fields about the surrogate key obtained by ranking lifecycles of the user attributes in accordance with the change times of the user attributes; and wherein fields of the event table comprises (iv) one or more fields about the surrogate key, (v) one or more fields about event details, and (vi) one or more fields regarding update times of the event details; and wherein the surrogate key is used to realize an association between changes of the user attributes and updates of the event details; and associate the dimension table with the event table to generate a report, generate an aggregate table in accordance with a predetermined aggregation demand, and store the generated aggregate table at a reporting layer.

20. The non-transitory computer-readable storage medium according to claim 19, wherein subsequent to associating the dimension table with the event table to generate the report, generating the aggregate table in accordance with the predetermined aggregation demand and storing the aggregate table at the reporting layer, the computer program is further executed by the processor, so as to synchronize the report and the aggregate table to a column-oriented memory database in an incremental manner.

* * * * *